United States Patent
Svrcek et al.

(10) Patent No.: US 10,215,229 B2
(45) Date of Patent: *Feb. 26, 2019

(54) MECHANISM FOR MAINTAINING A CLEARANCE GAP

(71) Applicant: EtaGen, Inc., Menlo Park, CA (US)

(72) Inventors: Matt Svrcek, Redwood City, CA (US); Scott Coakley, Belmont, CA (US)

(73) Assignee: EtaGen, Inc., Menlo Park, CA (US)

( * ) Notice: Subject to any disclaimer, the term of this patent is extended or adjusted under 35 U.S.C. 154(b) by 96 days.

This patent is subject to a terminal disclaimer.

(21) Appl. No.: 13/830,591

(22) Filed: Mar. 14, 2013

(65) Prior Publication Data
US 2014/0260951 A1    Sep. 18, 2014

(51) Int. Cl.
| F16C 29/02 | (2006.01) |
| F01B 23/10 | (2006.01) |
| F16J 1/06 | (2006.01) |
| F02F 3/00 | (2006.01) |

(52) U.S. Cl.
CPC ............ F16C 29/025 (2013.01); F01B 23/10 (2013.01); F02F 3/00 (2013.01); F16J 1/06 (2013.01)

(58) Field of Classification Search
CPC  F04B 53/008; F04B 39/045; F16J 1/09; F16J 1/02; F16J 15/406
USPC ....... 92/158, 160, DIG. 1, DIG. 2, 204, 240; 277/452, 487, 473, 491, 447; 384/10, 16, 384/42, 29
See application file for complete search history.

(56) References Cited

U.S. PATENT DOCUMENTS

| 736,735 A | * | 8/1903 | Junkin | ............................ 92/112 |
| 1,679,964 A | | 8/1928 | Edwards | |
| 1,867,718 A | * | 7/1932 | Towell | ............................ 92/184 |

(Continued)

FOREIGN PATENT DOCUMENTS

| CN | 101363353 A | 2/2009 |
| DE | 202005018178 U1 | 2/2006 |

(Continued)

OTHER PUBLICATIONS

G. Belforte, et al. "Study and Realization of High Efficiency Sealless Cylinder," International Fluid Power Exposition, Mar. 24-26, 1992, 10 pages, National Fluid Power Association.

(Continued)

Primary Examiner — F. Daniel Lopez
Assistant Examiner — Michael Quandt
(74) Attorney, Agent, or Firm — Haley Guiliano LLP

(57) ABSTRACT

An element is provided to maintain a clearance gap between a piston and a cylinder wall. In some embodiments, an element is included that is capable of spatial change. In some embodiments, the element is a component such as a clearance ring, a surface bearing, or a segment of a clearance ring or surface bearing. A clearance gap may be maintained by inward and outward motion of the component with respect to a piston assembly and a cylinder wall, where the motion is determined by a balance of forces acting on the component. In some embodiments, an inward force generated by an external gas pressure source is balanced by an outward preload force generated by, for example, a pneumatic piston. In some embodiments, a clearance gap is maintained based on in part on the ratio of inner to outer surface areas of a clearance ring.

25 Claims, 6 Drawing Sheets

(56) References Cited

U.S. PATENT DOCUMENTS

| | | | |
|---|---|---|---|
| 2,413,751 A | | 1/1947 | Wolcott |
| 2,449,297 A | | 9/1948 | Hoffer |
| 2,567,042 A | | 9/1951 | Wemp et al. |
| 2,809,873 A | | 10/1957 | Cavileer |
| 2,814,551 A | | 11/1957 | Broeze et al. |
| 2,907,304 A | | 10/1959 | Macks et al. |
| 3,001,609 A | | 9/1961 | Macks et al. |
| 3,035,879 A | | 5/1962 | Ziircher et al. |
| 3,170,406 A | | 2/1965 | Robertson et al. |
| 3,190,271 A | | 6/1965 | Gudmundsen |
| 3,225,617 A | | 12/1965 | Young et al. |
| 3,359,872 A | * | 12/1967 | Foster .................. 92/172 |
| 3,521,531 A | * | 7/1970 | Kaesemodel .......... 92/160 |
| 3,548,721 A | | 12/1970 | Eisennegger |
| 3,588,291 A | * | 6/1971 | Curwen .................. 17/417 |
| 3,653,303 A | | 4/1972 | Zurcher et al. |
| 3,663,071 A | | 5/1972 | Kates et al. |
| 3,749,066 A | | 7/1973 | Cseh |
| 3,777,621 A | | 12/1973 | Blok et al. |
| 3,777,722 A | * | 12/1973 | Lenger .................. 123/46 R |
| 3,779,672 A | | 12/1973 | Schroeder et al. |
| 3,859,971 A | | 1/1975 | Rauen |
| 3,956,895 A | | 5/1976 | Noble et al. |
| 3,974,745 A | | 8/1976 | Godmaire |
| 4,013,047 A | | 3/1977 | Harned |
| 4,048,975 A | | 9/1977 | Urquhart |
| 4,069,794 A | | 1/1978 | Jordan |
| 4,111,104 A | | 9/1978 | Davison, Jr. |
| 4,135,723 A | | 1/1979 | Urquhart |
| 4,137,015 A | * | 1/1979 | Grossman ............ 417/366 |
| 4,154,200 A | | 5/1979 | Jarret et al. |
| 4,246,833 A | | 1/1981 | Burklund |
| 4,304,410 A | | 12/1981 | Erickson et al. |
| 4,308,720 A | | 1/1982 | Brandstadter |
| 4,455,974 A | | 6/1984 | Shapiro et al. |
| 4,462,348 A | * | 7/1984 | Giardini ............ F02N 99/006 |
| | | | 123/179.1 |
| 4,470,375 A | | 9/1984 | Showalter |
| 4,480,599 A | | 11/1984 | Allais |
| 4,485,779 A | | 12/1984 | Spurk |
| 4,493,292 A | | 1/1985 | Showalter |
| 4,522,163 A | | 6/1985 | Hooper |
| 4,545,738 A | | 10/1985 | Young |
| 4,560,213 A | * | 12/1985 | Enderle et al. .......... 384/12 |
| 4,627,795 A | | 12/1986 | Schmitz-Montz |
| 4,644,851 A | | 2/1987 | Young |
| 4,719,846 A | * | 1/1988 | Langstroth .............. 92/127 |
| 4,776,260 A | | 10/1988 | Vincze |
| 4,776,261 A | * | 10/1988 | Larson .................. 92/174 |
| 4,799,421 A | | 1/1989 | Bremer et al. |
| 4,846,051 A | | 7/1989 | Wade et al. |
| 4,854,156 A | * | 8/1989 | Hoeffel et al. .......... 73/37.5 |
| 4,876,991 A | | 10/1989 | Galitello, Jr. |
| 4,889,039 A | | 12/1989 | Miller |
| 4,924,956 A | | 5/1990 | Deng et al. |
| 4,932,313 A | | 6/1990 | Gutknecht |
| 5,030,182 A | | 7/1991 | Frost |
| 5,115,768 A | | 5/1992 | Peschka et al. |
| 5,140,905 A | | 8/1992 | Dhar |
| 5,174,728 A | | 12/1992 | Kimura et al. |
| 5,313,875 A | | 5/1994 | Kadlicko |
| 5,454,351 A | | 3/1995 | Cao et al. |
| 5,701,797 A | * | 12/1997 | Mohn .................. 92/80 |
| 5,775,273 A | | 7/1998 | Beale |
| 5,832,880 A | | 11/1998 | Dickey |
| 5,967,017 A | | 10/1999 | Hooke et al. |
| 6,016,738 A | * | 1/2000 | Elferink et al. .......... 92/127 |
| 6,135,069 A | | 10/2000 | Fenelon et al. |
| 6,170,442 B1 | | 1/2001 | Beale |
| 6,199,519 B1 | | 3/2001 | Van Blarigan |
| 6,276,313 B1 | | 8/2001 | Yang et al. |
| 6,293,184 B1 | | 9/2001 | Unger |
| 6,314,924 B1 | | 11/2001 | Berlinger |
| 6,349,681 B1 | | 2/2002 | Li |
| 6,374,924 B1 | | 4/2002 | Hanton et al. |
| 6,378,875 B1 | * | 4/2002 | Feistel .................. 277/493 |
| 6,415,745 B1 | | 7/2002 | Hellen et al. |
| 6,443,104 B1 | | 9/2002 | Simescu et al. |
| 6,532,916 B2 | | 3/2003 | Kerrebrock |
| 6,541,875 B1 | | 4/2003 | Berlinger et al. |
| 6,863,507 B1 | | 3/2005 | Schaeffer et al. |
| 6,901,845 B2 | * | 6/2005 | Kiikka .................. 92/153 |
| 6,945,202 B2 | | 9/2005 | Kaneko et al. |
| 7,052,182 B2 | * | 5/2006 | Shinohara et al. ...... 384/12 |
| 7,082,909 B2 | | 8/2006 | Graf et al. |
| 7,104,227 B2 | | 9/2006 | Roberts |
| 7,258,085 B2 | | 8/2007 | Niiyama et al. |
| 7,387,062 B2 | | 6/2008 | Chen |
| 7,438,027 B1 | | 10/2008 | Hinderks |
| 7,469,664 B2 | | 12/2008 | Hofbauer et al. |
| 7,470,065 B2 | * | 12/2008 | Stadlmayr et al. ...... 384/285 |
| 7,600,464 B2 | | 10/2009 | Cale et al. |
| 7,622,814 B2 | | 11/2009 | Hyde et al. |
| 7,624,574 B2 | | 12/2009 | Sawada et al. |
| 7,640,910 B2 | | 1/2010 | Lemke et al. |
| 7,669,516 B2 | * | 3/2010 | Cromm et al. .......... 92/240 |
| 7,690,199 B2 | | 4/2010 | Wood |
| 7,690,900 B2 | | 4/2010 | Sieber |
| 7,784,436 B2 | | 8/2010 | Lemke et al. |
| 7,845,317 B2 | | 12/2010 | Max et al. |
| 7,861,679 B2 | | 1/2011 | Lemke et al. |
| 8,040,011 B2 | | 10/2011 | Mueller et al. |
| 8,402,931 B2 | | 3/2013 | Simpson et al. |
| 8,413,617 B2 | | 4/2013 | Simpson et al. |
| 8,607,560 B2 | * | 12/2013 | Fiedler .................. 60/517 |
| 2005/0284427 A1 | | 12/2005 | Barth |
| 2006/0157003 A1 | | 7/2006 | Lemke et al. |
| 2007/0215093 A1 | | 9/2007 | Lemke et al. |
| 2007/0251487 A1 | | 11/2007 | Heidrich et al. |
| 2008/0078288 A1 | | 4/2008 | Heidrich et al. |
| 2008/0271711 A1 | | 11/2008 | Cheeseman |
| 2009/0031991 A1 | | 2/2009 | Lindegarde |
| 2009/0095260 A1 | | 4/2009 | Marchetti |
| 2009/0125211 A1 | | 5/2009 | Akihisa et al. |
| 2009/0199821 A1 | | 8/2009 | Marchetti |
| 2009/0277516 A1 | | 11/2009 | Winkler et al. |
| 2009/0308345 A1 | | 12/2009 | Van den Brink |
| 2010/0109343 A1 | | 5/2010 | Lemke et al. |
| 2010/0162998 A1 | | 7/2010 | Graef |
| 2010/0218496 A1 | | 9/2010 | Miles et al. |
| 2011/0174271 A1 | | 7/2011 | Wood |
| 2011/0219763 A1 | | 9/2011 | McBride et al. |
| 2012/0125288 A1 | | 5/2012 | Simpson et al. |
| 2012/0125291 A1 | | 5/2012 | Simpson et al. |
| 2012/0126543 A1 | | 5/2012 | Simpson et al. |
| 2012/0204836 A1 | | 8/2012 | Roelle et al. |
| 2012/0227699 A1 | | 9/2012 | Perry et al. |

FOREIGN PATENT DOCUMENTS

| | | |
|---|---|---|
| DE | 102007056527 | 5/2009 |
| EP | 0330326 A2 | 8/1989 |
| EP | 2357348 A1 | 8/2011 |
| GB | 1125524 A | 8/1968 |
| JP | S59 101565 A | 6/1984 |
| JP | 2002322946 | 11/2002 |
| JP | 2003343202 | 12/2003 |
| JP | 2008223657 | 9/2008 |
| JP | 2009216100 | 9/2009 |
| WO | WO 02/44593 A1 | 6/2002 |
| WO | WO 03/106827 A1 | 12/2003 |
| WO | 2010118738 | 10/2010 |

OTHER PUBLICATIONS

G. Belforte, et al. "Analysis, Design, and Comparison of Different Types of Pistons for Sealless Pneumatic Cylinders and Valves," Tribology Transactions, 2005, vol. 48, Issue 3, pp. 377-388, Copyright Society of Tribologists and Lubrication Engineers.

International Search Report and Written Opinion dated Mar. 28, 2012 for Application No. PCT/US2011/061145; 10 pages.

International Search Report and Written Opinion dated Apr. 18, 2012 for Application No. PCT/US201166214; 16 pages.

(56) References Cited

OTHER PUBLICATIONS

R. Mikalsen; "A Review of Free-Piston Engine History and Applications;" Applied Thermal Engineering 27 (2007) pp. 2339-2352.
Jeffrey G. Schreiber; "Development Considerations on the Free-Piston Stirling Power Convertor for Use in Space;" NASA TM May 2007—214805.
Peter Van Blarigan; "Free-Piston Engine," Transportation Energy Center; FY 2009 DOE Vehicle Technologies Program Annual Merit Review; May 19, 2009.
Seon-Young Kim; "Specific Power Estimations for Free-Piston Stirling Engines;" American Institute of Aeronautics & Astronautics; Jun. 2006; pp. 1-8.
Peter Van Blarigan; "Advanced Internal Combustion Engine Research;" DOE Hydrogen Program Reveiw NREL-CP-570-28890 (2000); pp. 1-19.
International Search Report and Written Opinion of the International Searching Authority for application No. PCT/US2014/020762, dated Aug. 7, 2014.
International Search Report and Written Opinion of the International Searching Authority for Application No. PCT/US2012/071523, dated Jun. 4, 2013. 13 pages.
International Search Report and Written Opinion of the International Searching Authority for Application No. PCT/US2012/071524, dated Jun. 4, 2013. 13 pages.
International Search Report and Written Opinion of the International Searching Authority for Application No. PCT/US2012/071525, dated Jun. 4, 2013. 13 pages.
International Search Report and Written Opinion of the International Searching Authority for Application No. PCT/US2012/071526, dated Jun. 4, 2013. 13 pages.
International Preliminary Report on Patentability for Application No. PCT/US2014/020762, dated Sep. 15, 2015.

\* cited by examiner

MECHANISM FOR MAINTAINING A CLEARANCE GAP

The present disclosure relates to a mechanism for maintaining a clearance gap between a piston and a cylinder wall.

BACKGROUND

Pistons are used in oil-based engines and pumps. Rings can be used in these systems to form a seal between a piston and a cylinder wall using oil lubricant.

SUMMARY

An element may maintain a clearance gap in a piston assembly between a piston and a cylinder wall by changing the overall effective diameter of the piston. The element may be included in a piston assembly, in an engine, in a pump, in any other suitable device, or any combination thereof. The element may include one or more components such as clearance rings, surface bearings, or any combination thereof. In some embodiments, the element may be proximate to the piston and capable of spatial change. For example, the element may move, change shape or geometry, otherwise be physically altered, or any combination thereof. The element may move to maintain a desired clearance gap with respect to a cylinder wall to compensate for, for example, thermal expansion, bore imperfections, mechanical forces, any other suitable reason, or any combination thereof.

In some embodiments, the element may maintain a clearance gap based on a balance of forces that act on the element. In an example, a clearance ring may have opposing forces acting on it that maintain an equilibrium distance from the cylinder wall, wherein the forces are generated by gas pressure and the balance is determined based on the pressure and surface area of inner and outer faces of the ring. In another example, a surface bearing may include an external pressurized gas source that generates an inward force on the element that is balanced by an outward force generated by a pneumatic piston. In another example, the blowby gas flow into a plenum between the element and the piston may be used in part to maintain the clearance gap.

BRIEF DESCRIPTION OF THE FIGURES

The above and other features of the present disclosure, its nature and various advantages will be more apparent upon consideration of the following detailed description, taken in conjunction with the accompanying drawings in which.

DETAILED DESCRIPTION OF THE FIGURES

The present disclosure is directed towards mechanisms for maintaining a clearance gap between a piston and a cylinder wall. Pistons and cylinder walls may be components of, for example, an engine or pump. A piston may travel along a lengthwise axis of a cylinder, and it may be desired that the gap between the piston and the cylinder is maintained in order to, for example, maintain a pressure gradient between two sides of the piston within the cylinder (or two portions of the cylinder) while permitting low or zero friction of motion of the piston within the cylinder. In some embodiments, the overall diameter of the piston may be adjusted to maintain a clearance gap between the piston and cylinder wall in order to compensate for geometric variations (e.g., cylinder diameter) associated with thermal expansion, cylinder wall diameter irregularities, mechanical forces, wear, or any other suitable variations, or any combination thereof. One or more components that maintain the clearance gap may include clearance rings, surface bearings, segments of clearance rings, segments of surface bearings, any other suitable elements, or any combination thereof. In some embodiments, components are capable of spatial change. As used herein, "spatial change" refers to any suitable physical rearrangement or reconfiguration of one or more components, such that an overall spatial configuration of the one or more components is altered by the spatial change. For example, a piston assembly may include a clearance ring that moves inward and outward to maintain a clearance gap between the piston assembly and a cylinder wall. As used herein, "inward" refers to motion and forces directed towards the axial center of piston, and "outward" refers to motion and forces away from the axial center of the piston. In some embodiments, spatial change may include coordinated movement among multiple components, independent movement of one or more component, any other suitable motion, or any combination thereof.

Figure 1:
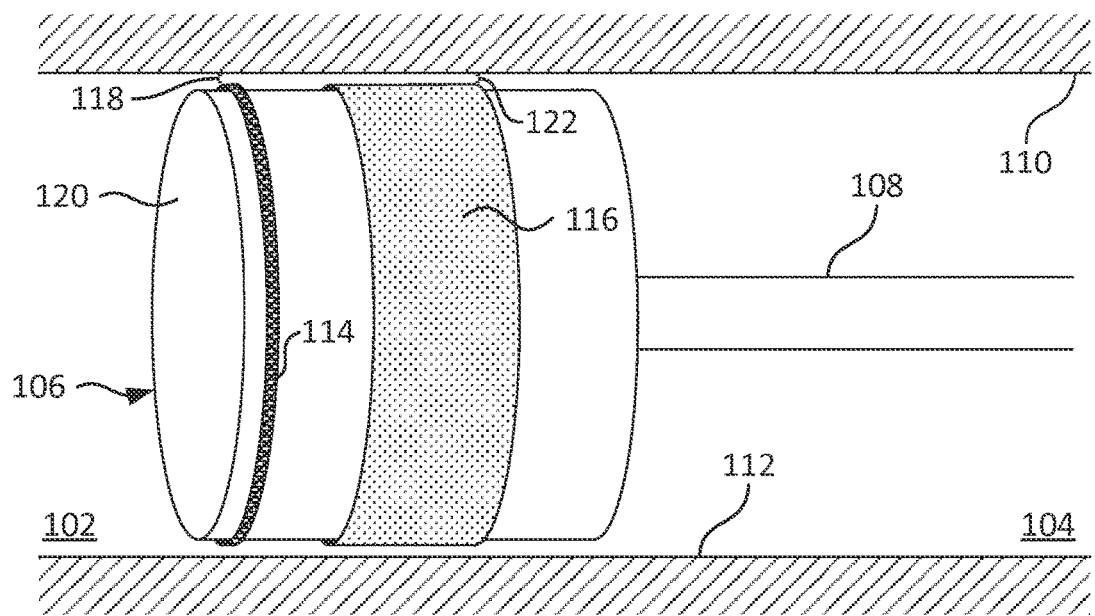
FIG. 1 shows a cutaway view of a piston in accordance with some embodiments of the present disclosure.

FIG. 1 shows a cutaway view of piston assembly 106 in accordance with some embodiments of the present disclosure. Piston assembly 106 includes piston 120, clearance ring 114, and surface bearing 116. Piston assembly 106 translates inside a cylinder that includes cylinder wall sections 110 and 112. In some embodiments, cylinder wall sections 110 and 112 may be part of a substantially continuous cylinder wall. In some embodiments, cylinder wall sections 110 and 112 may be sections of a cylinder made up of independent section coupled together. In some embodiments, piston assembly 106 translates inside the cylinder without contacting cylinder wall sections 110 and 112. The cylinder includes section 102 and section 104, where the sections are separated by piston assembly 106. In some embodiments, section 102 is a compression section. For example, section 102 may be a combustion section of an engine or a portion of a cylinder where gas is compressed in a pump such as an air compressor or vacuum pump. In some embodiments, piston rod 108 is coupled to piston assembly 106. Piston rod 108 may connect to a device that converts or transmits energy. For example, piston rod 108 may connect to an electromagnetic generator, a crankshaft, a drive mechanism for a pump, any other suitable device, or any combination thereof.

In some embodiments, piston assembly 106 may maintain a clearance gap 118 between cylinder wall sections 110 and 112. Clearance gap 118 may be disturbed by a number of factors, such as thermal expansion of the cylinder, piston, or both, manufacturing variations in the cylinder bore diameter, wear, mechanical loads on the piston assembly, on the cylinder, or on both, pressure loads on the piston assembly, on the cylinder, or on both, any other suitable factor, or any combination thereof. In some embodiments, piston assembly 106 may maintain a particular clearance gap 118, as small a clearance gap as possible, or a sufficiently small clearance gap between a portion of the piston and the cylinder wall in order to minimize gas leakage past piston assembly 106 from section 102 to section 104.

In some embodiments, clearance gap 118, and any other space between the piston assembly 106 and cylinder wall sections 110 and 112, are substantially filled with gas. For example, while a small amount of liquid fuel may be present in clearance gap 118 when a liquid fuel is used in an engine, the gap will still primarily include gas, the amount of any liquid being negligible. Gas in clearance gap 118 may include gas from a combustion reaction, gas introduced from an external source, ambient atmosphere, any other suitable gas, or any combination thereof. For example, gases may include oxygen, carbon dioxide, carbon monoxide, nitrogen, water vapor, hydrogen, methane, ethane, propane, butane, natural gas, liquefied petroleum gas, gasoline vapor, or any other suitable gas, or any combination thereof.

In some embodiments, clearance ring 114 maintains clearance gap 118 between piston assembly 106 and cylinder wall sections 110 and 112. For example, clearance gap 118 maintained by clearance ring 114 may establish and/or maintain a pressure difference between section 102 and section 104. In some embodiments, clearance ring 114 dynamically adjusts in size, shape, or configuration to maintain a desired clearance gap, as will be described in further detail below. In some embodiments, surface bearing 116 maintains clearance gap 122 from cylinder wall sections 110 and 112. It will be understood that the particular clearance gap 118 and clearance gap 122 may, but need not, be the same. In some embodiments, clearance seal 118 and surface bearing 116 may be rigidly linked and/or the same component such that clearance gap 118 and clearance gap 122 are the same, similar, or correlated.

In some embodiments, clearance ring 114, surface bearing 116, or both, maintain clearance gap 118, clearance gap 122, or both, from cylinder wall sections 110 and 112 based on a balance of forces. Forces may include gas pressure forces from gas in the cylinder, gas pressure forces from an external pressure source, mechanical forces such as springs and elastomers, any other suitable forces, or any combination thereof. In some embodiments, a balance of inward and outward forces may dynamically adjust such that a desired clearance gap from the cylinder walls is maintained at or near an equilibrium position. In some embodiments, the overall diameter of piston assembly 106 may adjust by moving clearance ring 114 and or surface bearing 116 inward and outward as piston assembly 106 traverses the cylinder.

It will be understood that piston assembly 106 may include piston 120, one or more clearance rings such as clearance ring 114, one or more surfaces bearings such as surface bearing 116, any other suitable components, or any combination thereof. In some embodiments one or more clearance rings may be used without any surface bearing, whereas in other embodiments one or more surface bearings may be used without any clearance ring. Any suitable combination of both one or more clearance rings as well as one or more surface bearings may be used in other embodiments. It will be understood that in some embodiments, clearance ring 114 and surface bearing 116 may be included as part of a single component.

Figure 2:
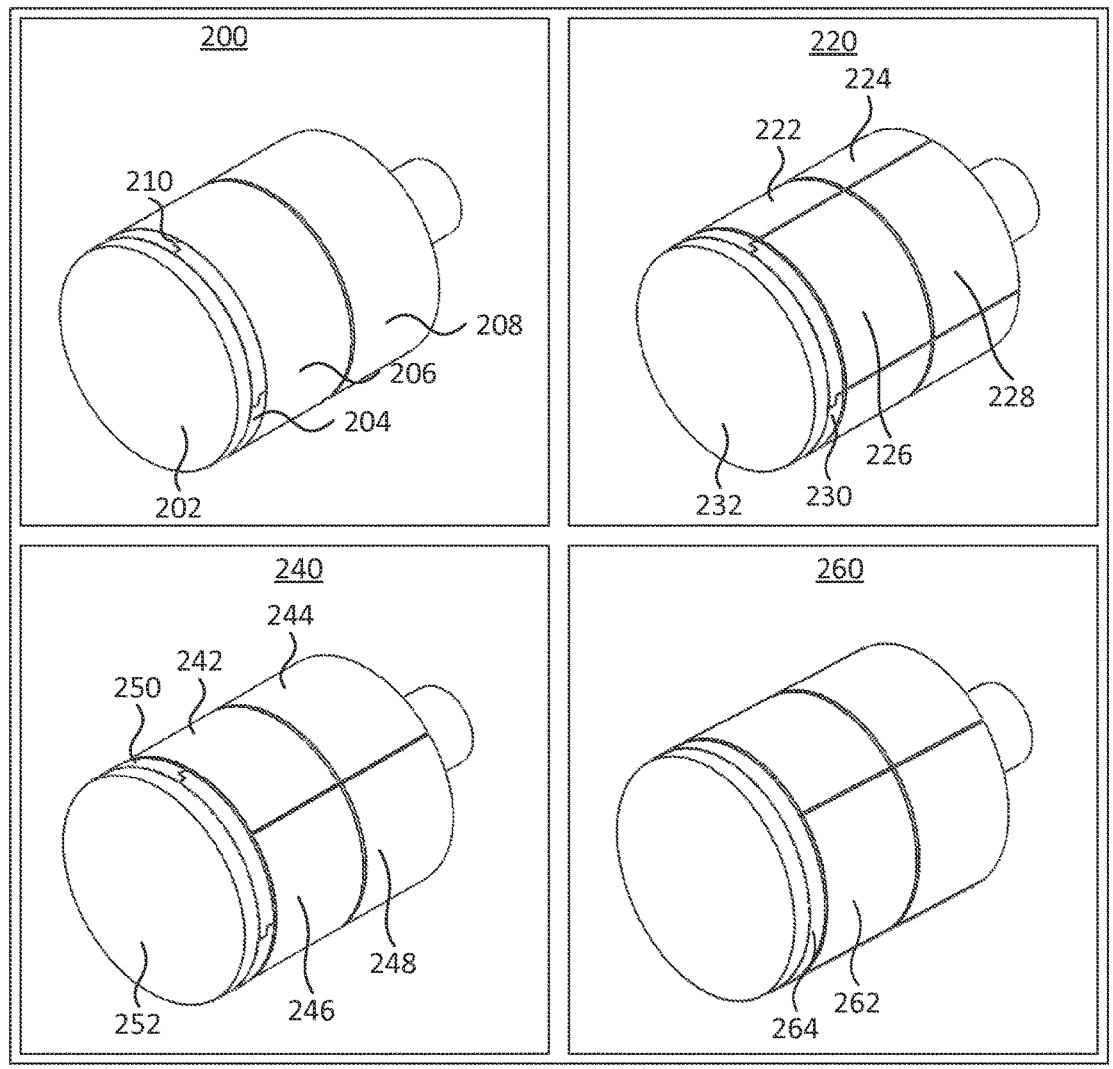
FIG. 2 shows exemplary configurations of piston assemblies in accordance with some embodiments of the present disclosure.

FIG. 2 shows exemplary configurations of piston 200, 220, 240, and 260, in accordance with some embodiments of the present disclosure. In some embodiments, clearance rings and/or surface bearings may be segmented such that they can expand and contract to dynamically adjust to maintain a desired distance from the cylinder wall. In some embodiments, segmented portions may move independently from one another. Piston assembly 200 shows a piston where clearance ring 204 can move and change size relative to piston face section 202, while bearings 206 and 208 are fixed.

Face section 202 may be a component of a piston assembly that, for example, faces the combustion section of a cylinder. Face section 202 may fill the majority of the cross-sectional area of the cylinder. Face section 202 may be coupled to clearance ring 204. In some embodiments, a sealing component provides a gas seal between face section 202 and the body of piston assembly 200. In some embodiments, clearance ring 204 provides a gas seal in addition to maintaining a clearance gap between the clearance ring and the cylinder wall. In some embodiments, a seal is provided by an elastomer, ceramic, by metal-to-metal contact, by any other suitable technique, or any combination thereof. In some embodiments, face section 202 may be integrated into the piston body such that a seal is not included. In some embodiments, clearance ring 204 corresponds to clearance ring 114 of FIG. 1. In some embodiments, clearance ring 204 limits the flow of blowby gas past piston assembly 200. Blowby gas may be gas generated, altered, or both during a portion of a compression cycle. In some embodiments, an engine may include a compression cycle where gas is compressed in a compression section of a cylinder. The compression may result in combustion. For example, fuel may be introduced to the combustion section of an engine such as section 102 of FIG. 1, and the combustion of that fuel may result in an increased gas pressure in section 102. The increased pressure may result in increased pressure in section 102 of FIG. 1 that does work on a piston by, for example, translating it in a cylinder. Blowby gas may refer to gas that moves between the piston and the cylinder wall from section 102 of FIG. 1. In another example, a pump such as an air compressor may compress gas in a compression section of a cylinder such as section 102 of FIG. 1 during a portion of a compression cycle.

Clearance ring 204 may be coupled to one or more bearings such as bearings 206 and 208. In some embodiments, bearings maintain the axial position of the piston within the cylinder. In some embodiments, bearings 206 and 208 are configured as described for surface bearing 116 of FIG. 1.

Piston assemblies 220, 240, and 260 illustrate further exemplary piston configurations. Piston assembly 220 includes clearance ring section 230 and surface bearings 222, 224, 226, and 228 that are fixed relative to one another, but can move independently of face section 232. Piston assembly 240 includes clearance ring 246 and surface bearings 242, 244, 246, and 248, some or all of which are able to move independently of the other bearing sections and independently of face section 252. In some embodiments, one or more surface bearings such as surface bearings 242, 244, 246, and 248, may be configured to spatially change such that the overall diameter of the piston may change. That is, the outer surface of the piston assembly includes components such as elements capable of spatial change. Piston assembly 260 includes fixed clearance ring 264 that need not be capable of spatial change. Surface bearings of piston assembly 260 such as surface bearing 262 may move and change size independently of other sections as described for piston assembly 240. In any of piston assemblies 200, 220, 240, and 260, the changeable effective diameter of the surface bearing, clearance rings, or both, may be accomplished by splitting the desired piston assembly component (e.g., clearance ring 204 of piston assembly 200) into one or more independently moveable segments. Individual segments may be rigid or flexible. For example, stepped connection 210 of piston assembly 200 may allow the size of clearance ring 204 to increase and decrease while maintaining a substantially continuous outer surface. In some embodiments, segments may overlap, dovetail, include multiple splits, have stepped portions to allow for expansion while maintaining a clearance gap, include flexible materials, include flexible segments between rigid segments, have any other suitable arrangement, or any combination thereof.

Figure 3:
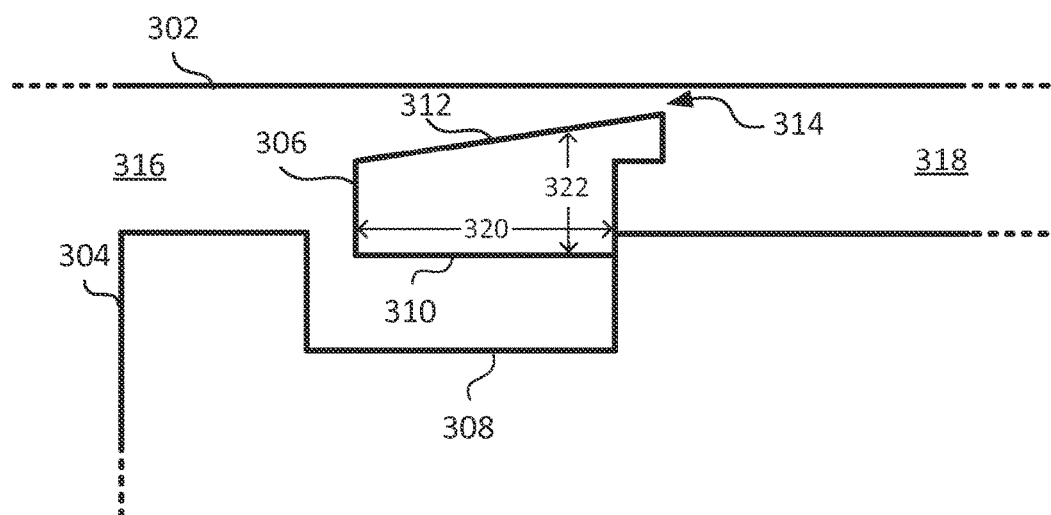
FIG. 3 shows a cross-section view of an exemplary tapered clearance ring in accordance with some embodiments of the present disclosure.

FIG. 3 shows a cross-section view of an exemplary tapered clearance ring in accordance with some embodiments of the present disclosure. In some embodiments, tapered clearance ring 306 corresponds to clearance ring 114 of FIG. 1. Clearance ring 306 may maintain a clearance gap between piston 304 and cylinder wall 302. Clearance ring 306 sits in groove 308 of piston 304 and separates upstream region 316 from downstream region 318. In some embodiments, piston 304 may correspond to piston assembly 106 of FIG. 1. In some embodiments, cylinder wall 302 may correspond to cylinder wall section 110 of FIG. 1. In some embodiments, clearance ring 306 may be flexible and/or segmented such that the overall diameter of the ring may adjust. Increasing the overall diameter of the ring may reduce the distance between clearance ring 306 and cylinder wall 302, and thus may reduce the size of clearance gap 314. In some embodiments, pressure from blowby gas is used to dynamically maintain the clearance gap. In an example, clearance gap 314 is on the order of 1-10 microns. In an example of a tapered configuration of clearance ring 306, the amount of taper may be on the order of several times the clearance gap. Where the clearance gap is 1-10 microns, the taper of clearance ring 306 may be a 3 to 40 micron change from the widest to the narrowest points. Thus in some embodiments, the amount of taper illustrated in FIG. 3 is exaggerated for clarity. Clearance ring 306 has width 320 and height 322. In an example, the width of the ring is approximately 1 to 20 millimeters. In an example, the height of the ring is approximately 1 to 10 millimeters. It will be understood that the above dimensions are merely exemplary and that larger or smaller dimensions may be used as desired. In some embodiments, dimensions of clearance ring 306 may be determined relative to the size of piston 304.

In some embodiments, as the size of clearance gap 314 decreases (that is, as clearance ring 306 gets closer to the cylinder wall 302), the pressure on outer face 312 increases, and/or the pressure on the inner face 310 decreases, such that the diameter of clearance ring 306 contracts and clearance gap 314 increases. As clearance gap 314 increases, the pressure balance between outer face 312 and inner face 310 shifts such that the ring expands, decreasing clearance gap 314. In this way, the diameter of clearance ring 306 is dynamically balanced by the inward forces on outer face 312 and the outward forces inner face 310. An equilibrium position is thus maintained at a particular clearance gap in a negative feedback loop. It will be understood that forces in addition to an inward and outward gas pressure force may act on clearance ring 306. It will be understood that forces need not be gas pressure forces but may also include other forces such as mechanical forces. For example, forces may include an inherent bending stiffness of clearance ring 306, friction between clearance ring 306 and groove 308, any other suitable force, or any combination thereof.

In some embodiments, upstream region 316 may be a region of higher pressure than downstream region 318 during at least a portion of a piston assembly cycle (e.g., a combustion cycle). The pressure in upstream region 316 pushes on inner face 310 of clearance ring 306, where the inner face has surface area $A_{inner}$. Outer face 312 of clearance ring 306 segment has surface area $A_{outer}$. As gas flows through clearance gap 314 from upstream region 316 to downstream region 318, there is a drop in pressure. The average amount of pressure on outer face 312 is referred to as $P_{outer}$. The pressure on inner face 310 is referred to as $P_{inner}$. In some embodiments, $P_{inner}$ may be greater than $P_{outer}$. In some embodiments, clearance ring 306 is shaped such that the pressure drop between the upstream section 316 and downstream section 318 occurs further towards downstream section 318, which may result in a higher average $P_{outer}$. The clearance gap may be maintained primarily as:

$$P_{inner} \cdot A_{inner} = P_{outer} \cdot A_{outer} \quad (1)$$

Thus, when the inner and outer forces on the ring are balanced, along with any other forces such as friction and stiffness, the size of the clearance gap is in equilibrium. Where $P_{outer}$ is less than $P_{inner}$, the area of the outer surface may be required to be larger than the area of the inner surface in order to establish or maintain equilibrium. Thus in some embodiments, a clearance ring may have any suitable configuration where the actual or effective $A_{outer}$ is greater than $A_{inner}$. In some embodiments, the ratio of the $A_{outer}$ to $A_{inner}$ in part determines the clearance gap.

In some embodiments, clearance gap 314, and any other space between the piston 304 and cylinder wall 302, is substantially filled with gas. For example, while a small amount of liquid fuel may be present in clearance gap 314 when a liquid fuel is used in an engine, the gap will still primarily include gas, the amount of any liquid being negligible. Gas in clearance gap 314 may include, for example, any suitable gases as described for clearance gap 118 of FIG. 1.

Figure 4:
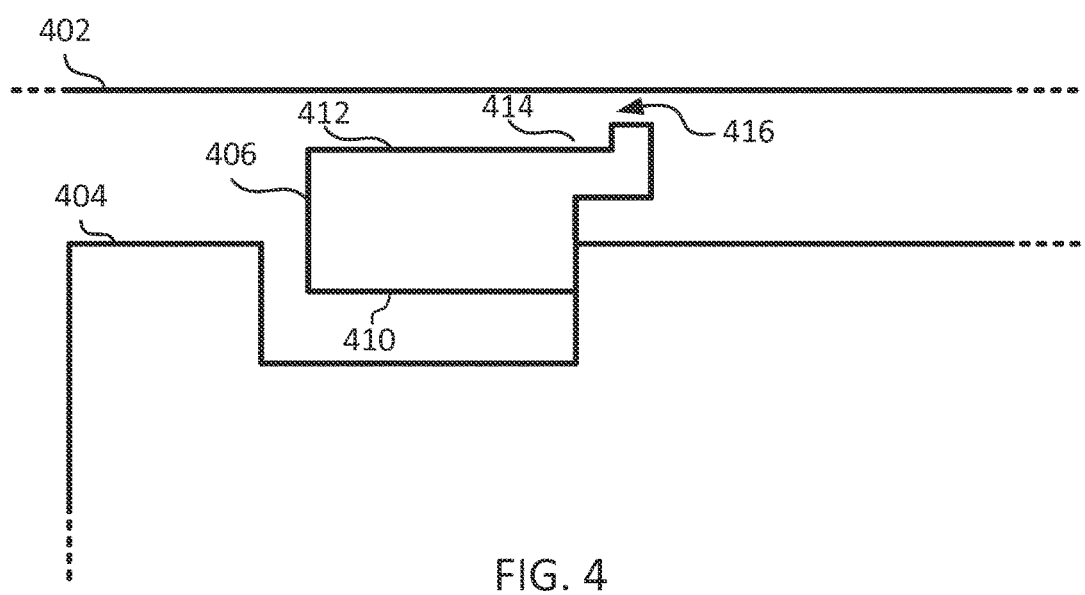
FIG. 4 shows a cross-section view of an exemplary stepped clearance ring in accordance with some embodiments of the present disclosure.

FIG. 4 shows a cross-section view of an exemplary stepped clearance ring in accordance with some embodiments of the present disclosure. Clearance ring 406 may maintain clearance gap 416 between piston 404 and cylinder wall 402. In some embodiments, outer face 412 may include stepped area 414, such that the total surface area of outer face 412 is greater than the surface area of inner face 410. Based on, for example, Equation 1 above, clearance gap 416 may be maintained based on the surface pressure and surface area of inner face 410 and outer face 412.

It will be understood that the tapered face of clearance ring 306 of FIG. 3 and the stepped face of clearance ring 406 of FIG. 4 are merely exemplary and that a clearance ring such may have any suitable configuration. Any suitable clearance ring configuration (e.g., shape, dimension, arrangement, etc.) may be used that establishes a negative feedback loop to maintain a clearance gap in accordance with the present disclosure. For example, a clearance ring may include multiple steps, a combination of steps and tapered areas, curved areas, any other suitable configuration, or any combination thereof.

Figure 5:
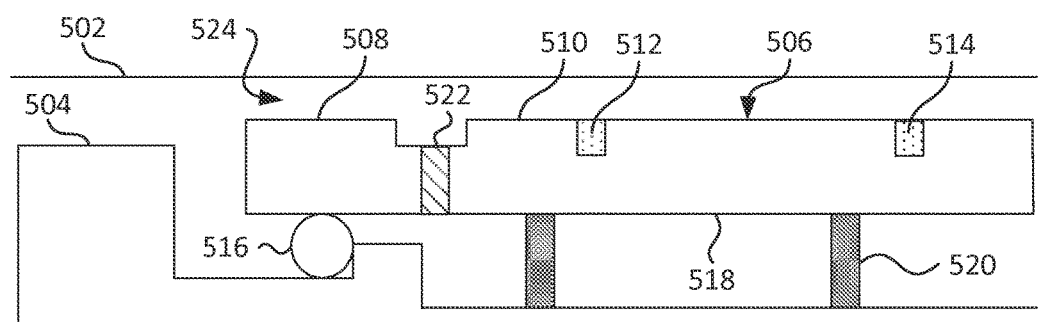
FIG. 5 shows a cross-section view of an exemplary surface bearing in accordance with some embodiments of the present disclosure.

FIG. 5 shows a cross-section view of an exemplary surface bearing for maintaining clearance gap 524 in accordance with some embodiments of the present disclosure. FIG. 5 includes cylinder wall 502, piston 504, and component 506. Cylinder wall 502 may correspond to cylinder wall section 110 of FIG. 1. Piston 504 may correspond to piston assembly 106 of FIG. 1. Component 506 may include clearance seal section 508 and bearing section 510. In some embodiments, component 506 may correspond to clearance seal 114 of FIG. 1, surface bearing 116 of FIG. 1, or both. In some embodiments, component 506 may be one segment of a segmented surface bearing, for example as illustrated for piston assembly 200 of FIG. 2. In some embodiments, component 506 may be a substantially continuous surface bearing that is capable of spatial change using, for example, flexible materials. In some embodiments, clearance seal section 508 and bearing section 510 may move independently from one another, may be fully or partially linked, or any combination thereof. It will be understood that one or more component 506 may form a surface bearing on piston 504 in any suitable configuration. For example, a set of multiple semi-cylindrical components such as component 506 may encircle piston 504. In another example, component 506 may be horizontally adjacent (with respect to the direction of travel of the piston) to another surface bearing component of the same or a different configuration (e.g., the adjacent component may not include a clearance seal).

In some embodiments, component 506 includes leakage flow section 522, past which leakage gas from the upstream portion of the cylinder may flow. The leakage flow is bypassed to the inner portion of the segment between component 506 and the piston and flows downstream to the end of the piston. Piston 504 may include one or more surface bearing sections (one is shown in the illustrated example). In some embodiments, externally pressurized gas is introduced into clearance gap 524 between surface bearings section 506 and the cylinder wall 502 at gas ports 512 and 514. In some embodiments, the use of an external pressure source allows for the maintaining of a desired clearance gap 524, independent of the combustion cycle or other piston assembly operation. In some embodiments, the pressure and flow of the pressurized gas source is independently controllable. The pressurized gas is introduced through a flow restriction, for example a number of small orifices such as gas ports 512 and 514, through a porous material, using any other suitable technique, or any combination thereof. Porous materials may include graphite, a machined or processed material, porous ceramic, porous sintered metal, any other suitable porous sintered material, any other suitable material, or any combination thereof.

As the surface bearing or bearings move closer to the cylinder wall, the restriction of flow for the pressurized gas out of clearance gap 524 between component 506 and cylinder 502 increases, and thus the pressure exerted on the surface bearing inward towards the piston increases. This inward force may be balanced by an outward preload that is applied to inner face 518 of component 506. The segment is moved closer to the cylinder wall until the force on the outer surface, (e.g., the product the pressure on the outer face times the surface bearing's surface area) is in equilibrium with the outward preload force on inner face 518. Thus, component 506 may maintain this fixed distance from the cylinder wall, and thus maintain clearance gap 524, as the position of the component changes to follow changes in cylinder wall 502 or piston 504. In some embodiments, where clearance seal 508 is rigidly connected to surface bearing component 510, a clearance gap for the clearance seal and the surface bearing are both maintained. It will be understood that depending on the configuration of component 506, the clearance gap of the clearance gap portion of component 506 need not be the same as the clearance gap of the surface bearing portion of component 506. It will also be understood that in some embodiments, a clearance seal such as clearance seal 306 of FIG. 3 or clearance seal 406 of FIG. 4 may be used in combination with one or more components such as component 506, where the clearance gaps for the clearance seal and component 506 are maintained independently.

The preload force applied to component 506 may be applied by preload force generator 520. Preload force generator 520 may include one or more springs, elastomers, pneumatic pistons, hydraulic pistons, hydraulic bellows, electrical controls, magnetic controls, memory wire, electrical actuators, electrical sensors, electromechanical devices, any other suitable preload force generator, or any combination thereof. In some embodiments, where a single component such as a surface bearing or clearance ring surrounds a piston with only a single split, the preload force may be generated by compression of the split segment into the cylinder. In the case of pneumatic or hydraulic systems, an externally driven gas or hydraulic supply may provide a force to preload force generator 520.

In some embodiments, preload force generator 520 may include a damping force generator. For example, a velocity-dependent damping force may be generated to counteract inward motion of component 506. Thus, the faster component 506 moves toward piston 504, the greater the damping force is generated in the outward direction. In an example, a hydraulic piston and/or an elastomer may generate a damping force. In some embodiments, the damping force may increase the stability of the piston assembly.

In some embodiments, component 506 is sealed to piston 504. In some embodiments, seals include overlapping steps as described for stepped connector 210 of FIG. 2. In some embodiments, a seal between component 506 and the piston 504 is maintained by component seal 516. Component seal 516 may include a radial or axial seal. Component seal 516 made of a polymer, elastomer, metal, ceramic, any other suitable material, or any combination thereof. In some embodiments, component seal 516 may be an o-ring, a v-ring, a u-cup, a split ring, a metal flexure, metal-metal contact between the ring and the body, a recessed seal, any other suitable seal configuration, or any combination thereof. In some embodiments, component seal 516 may be omitted and a seal may be formed between component 506 and piston 504 using metal to metal contact, any other suitable technique, or any combination thereof.

Figure 6:
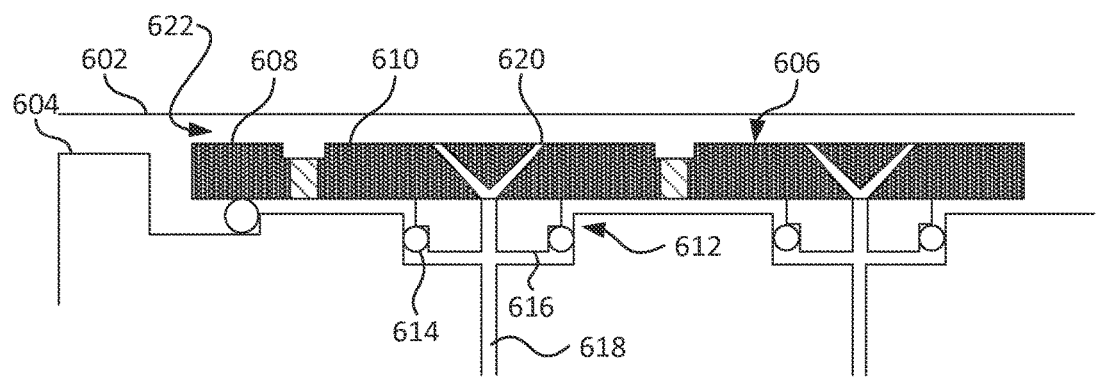
FIG. 6 shows a cross-section view of an exemplary surface bearing for maintaining a clearance gap with an external pressurized gas source in accordance with some embodiments of the present disclosure.

FIG. 6 shows a cross-section view of an exemplary surface bearing for maintaining clearance gap 622 with an external pressurized gas source in accordance with some embodiments of the present disclosure. FIG. 6 includes cylinder wall 602, piston 604, and component 606. Cylinder wall 602 may correspond to cylinder wall section 110 of FIG. 1. Piston 604 may correspond to piston assembly 106 of FIG. 1. FIG. 6 includes component 606, which may include clearance seal section 608 and bearing section 610. In some embodiments, component 606 may correspond to clearance seal 114 of FIG. 1, surface bearing 116 of FIG. 1, or both. In some embodiments, component 606 may be one segment of a segmented surface bearing, for example as illustrated for piston assembly 220 of FIG. 2. In some embodiments, component 606 may be a substantially continuous surface bearing that is capable of spatial change using, for example, flexible materials. In some embodiments, clearance seal section 608 and bearing section 610 may move independently from one another, may be fully or partially linked, or any combination thereof. It will be understood that one or more component 606 may form a surface bearing on piston 604 in any suitable configuration. For example, a set of multiple semi-cylindrical components such as component 606 may encircle piston 604. In another example, component 606 may be horizontally adjacent (with respect to the direction of travel of the piston) to another surface bearing component of the same or a different configuration (e.g., the adjacent component may not include a clearance seal).

In some embodiments, an external gas supply is connected at gas inlet 618. In the illustrated example, the gas pressure supplied to gas inlet 618 generates both the preload force applied by pneumatic piston assembly 612 and the inward force generated by gas exiting orifice 620. Pneumatic piston assembly 612 generates an outward preload force by applying gas pressure to inner face 616, which is sealed to piston 604 by seal 614. Concurrently, the external gas pressure provides an inward force by exiting through orifice 620 between the outer face of component 606 and cylinder wall 602. In some embodiments, clearance gap 622 between component 606 and cylinder wall 602 is determined based on the externally supplied gas pressure, the design of the pneumatic piston assembly, the surface area of component 606, the size and design of orifices such as orifice 620, any other suitable parameters, or any combination thereof. In some embodiments, the use of an externally pressurized gas source may maintain clearance gap 622 in the absence of other piston assembly activity such as a combustion cycle. For example, component 606 may maintain clearance gap 622 during a startup period of an engine or during low pressure portions of a combustion cycle.

Figure 7:
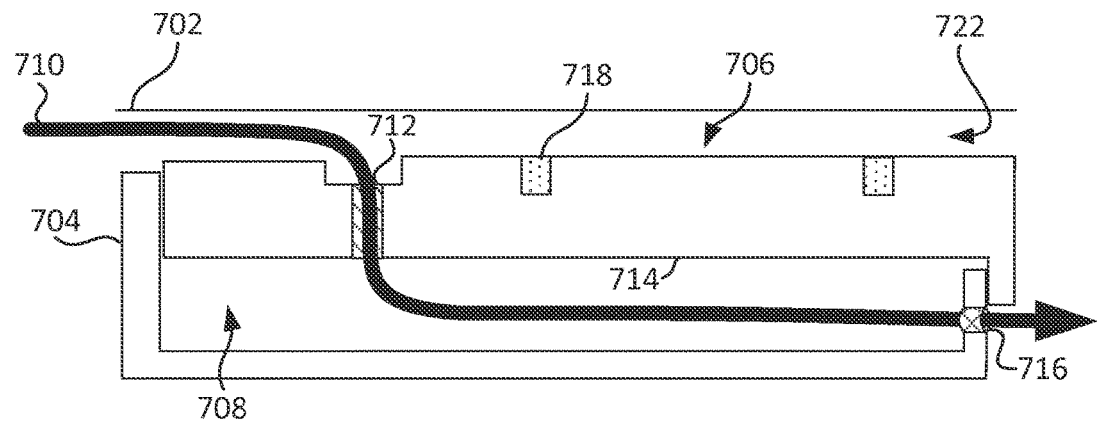
FIG. 7 shows an exemplary surface bearing using blowby gas to generate a force, in accordance with some embodiments of the present disclosure.

FIG. 7 shows exemplary component 706 using gas flow 710 to generate a force, in accordance with some embodiments of the present disclosure. FIG. 7 includes cylinder wall 702, piston 704, and component 706. Cylinder wall 702 may correspond to cylinder wall section 110 of FIG. 1. Piston 704 may correspond to piston assembly 106 of FIG. 1. FIG. 7 includes component 706, which may include a clearance seal section and a bearing section. In some embodiments, component 706 may correspond to clearance seal 114 of FIG. 1, surface bearing 116 of FIG. 1, or both. In some embodiments, component 706 may be one segment of a segmented surface bearing, for example as illustrated for piston assembly 220 of FIG. 2. In some embodiments, component 706 may be a substantially continuous surface bearing that is capable of spatial change using, for example, flexible materials.

In some embodiments, a portion of gas flow 710 is used to generate an outward force additionally or alternatively to a preload force. The force corresponding to gas flow 710 is balanced by an inward force generated by, for example, an external pressurized gas force.

In some embodiments, an external pressurized gas supply provides an inward force by exiting at gas port 718, as described, for example, for gas port 512 of FIG. 5 or orifice 620 of FIG. 6. Gas flow 710 passes through leakage flow section 712 to plenum 708, and exits plenum 708 through flow restrictor 716. Gas flow 710 may include any suitable gas or vapor included in a piston assembly, as described above.

In some embodiments, the amount of gas flow 710 into plenum 708 is determined primarily by the gas flow through clearance gap 722 between component 706 and cylinder wall 702. Thus, as component 706 moves closer to the cylinder wall 702, the amount of blowby gas flow through clearance gap 722 decreases, gas 710 flow into plenum 708 increases, and the pressure in plenum 708 increases. When component 706 moves further from cylinder wall 702, the amount of blowby gas flow through clearance gap 722 increases, gas flow 710 into plenum 708 decreases, and the pressure in plenum 708 decreases. The amount of outward force on component 706 corresponds to the amount of pressure in plenum 708.

The flow of gas out of plenum 708 is controlled by flow restrictor 716. In some embodiments, gas flow 710 and flow restrictor 716 generate a gas pressure in plenum 708, which generates an outward force on inner face 714 of component 706. In some embodiments, an additional an outward preload force is generated, for example using techniques as described for preload force generator 520 of FIG. 5. Thus, the flow of gas flow 710 through plenum 708 may provide additional control over an amount of outward force on component 706. This outward force may be balanced by an inward force generated by, for example, the connection of gas port 718 to an external pressurized gas source. Thus, the equilibrium position of component 706, and accordingly the size of clearance gap 722, is determined based on the design of flow restrictor 716, the flow leakage rate through flow leakage section 708, the inner and outer surface areas of component 706, an external pressurized gas source, additional preload forces, any other suitable parameter, or any combination thereof. In some embodiments, the equilibrium clearance gap maintained by component 706 corresponds to an equilibrium amount of gas flow 710, and component 706 will move so as to maintain a desired gas flow rate.

Figure 8:
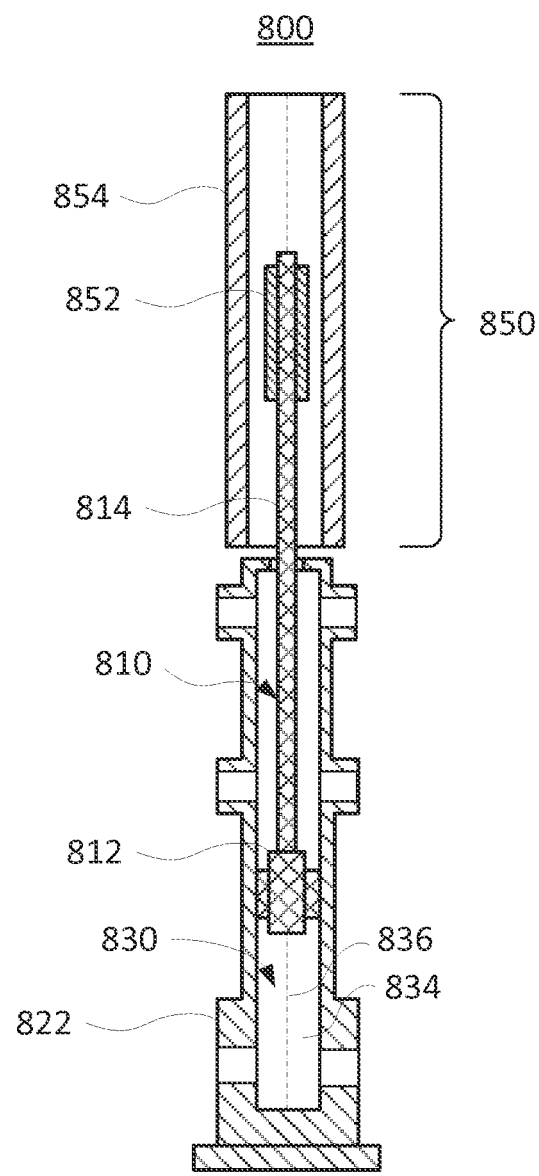
FIG. 8 shows a cross-section view of an illustrative piston engine including an illustrative multiphase electromagnetic machine, in accordance with some embodiments of the present disclosure.

FIG. 8 shows a cross section view of an illustrative piston engine 800 including an illustrative multiphase electromagnetic machine 850, in accordance with some embodiments of the present disclosure. It will be understood that piston engine 800 is merely exemplary and that the piston assembly, clearance rings, surface bearings, and other elements described herein may be used in any suitable engine, pump, other device, or combination thereof. Engines may include electromagnetic engines, free-piston engines, opposed-piston engines (e.g., either coupled to a common piston rod or coupled to respective independent rods and moving independently), reciprocating engines of any suitable configuration, any other suitable engine, or any combination thereof.

In some embodiments, illustrative piston engine 800 includes a piston such as piston assembly 106 of FIG. 1. Piston engine 800 includes a cylinder 822 having a bore 834 and a combustion section 830, as well as a substantially rigid piston assembly 810 configured to translate along axis 836 of bore 834. In the illustrated embodiment, piston assembly 810 includes piston 812, piston rod 814, translator 852, although any other suitable components that are not shown, or any combination thereof, may be included. It will be understood that in some embodiments, an engine may include one or more pistons. It will be understood that each respective piston of an engine with one or more pistons may include any suitable combination of clearance rings, surface bearings, combined ring/bearing components, or any combination thereof.

Combustion, fluid compression, and fluid expansion of an engine fluid may occur in combustion section 830, with piston assembly 810 providing mechanical work interactions with the engine fluid. Motion of piston assembly 810, and specifically translator 852, relative to the stator 854 may allow electromagnetic work interactions. For example, electromagnetic work may be extracted from stator 854 caused by relative motion of translator 852 (e.g., to extract work from an expansion stroke of piston assembly 810). In a further example, electromagnetic work may be supplied to stator 854 to cause relative motion of translator 852 (e.g., to provide work input during a compression stroke of piston assembly 810). Multiphase electromagnetic machine 850 may include a permanent magnet machine, an induction machine, a switched reluctance machine, any other suitable electromagnetic machine, or any combination thereof. For example, translator 852 may include a permanent magnet, and stator 854 may include a wire coil which may conduct an induced current generated by the motion of translator 852. In a further example, translator 852 may include a conductive assembly without permanent magnets (e.g., having conductive linkages) in which induced currents may flow, and stator 854 may include a wire coil which may conduct an induced current generated by the motion of translator 852.

In some embodiments, piston engine 800 may function as a pump. For example, electromagnetic machine 850 may be used to drive piston assembly 810 in order to compress and/or pump liquids, gases, or any other suitable material in combustion section 830.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed:

1. A piston assembly comprising:
    a piston;
    at least one ring element proximate to the piston, the at least one ring element capable of spatial change relative to the piston, wherein the ring element is configured to cause a pressure difference between a first section of a cylinder and a second section of the cylinder during at least a portion of a compression cycle, the cylinder having an axis along which the piston assembly translates, wherein the first section is a compression section and wherein the first section and the second section are defined by a location of the ring element in the cylinder; and
    a plurality of surface bearing segments proximate to the piston and arranged in the second section of the cylinder, wherein each respective surface bearing segment of the plurality of surface bearing segments is configured to move independently from other surface bearing segments in a direction substantially orthogonal to the translation of the piston, wherein:
        the plurality of surface bearing segments comprise a flow restriction;
        the plurality of surface bearing segments are configured to maintain a clearance gap between the plurality of surface bearing segments and the second section the cylinder,
        the clearance gap is maintained based at least in part on an outward preload force and an inward force acting on each of the plurality of surface bearing segments, wherein the inward force is generated by a pressure in the clearance gap caused by a flow of gas from a non-atmospheric pressurized gas source external of the cylinder through the flow restriction and into the clearance gap, and
        the clearance gap is comprised substantially of the gas.

2. The piston assembly of claim 1, wherein the compression section comprises a combustion section.

3. The piston assembly of claim 1, wherein the at least one ring element is at least in part disposed in a groove on a surface of the piston.

4. The piston assembly of claim 1, wherein the at least one ring element comprises a first face and a second face, and wherein a force generated by a first gas pressure on the first face of the ring element is balanced by a second gas pressure on the second face of the ring element.

5. The piston assembly of claim 4, wherein a clearance gap between the first face of the ring element and a surface of the cylinder occurs based at least in part on a difference between the surface area of the first face of the ring element and the surface area of the second face of the ring element.

6. The piston assembly of claim 4, wherein the first face comprises a stepped geometry.

7. The piston assembly of claim 4, wherein the first face comprises a tapered geometry.

8. The piston assembly of claim 1, wherein the preload force comprises a force generated at least in part by the pressurized gas source.

9. The piston assembly of claim 1, wherein the at least one surface bearing element further comprises a gas-permeable material and wherein the at least one of the forces is generated at least in part by the flow of gas flowing through the gas-permeable material.

10. The piston assembly of claim 9, wherein the gas-permeable material comprises graphite.

11. The piston assembly of claim 1, wherein the preload force comprises a force generated by a spring.

12. The piston assembly of claim 1, wherein the preload force comprises a damping force, wherein the damping force opposes movement of each of the surface bearing segments in a direction substantially orthogonal to the translation of the piston.

13. The piston assembly of claim 1, wherein the at least one ring element is capable of spatial change and is configured to move in a direction substantially orthogonal to the translation of the piston.

14. The piston assembly of claim 1, wherein each of the at least one ring element is segmented into respective two or more segments each configured to move in a direction substantially orthogonal to the translation of the piston independently from other segments of the at least one ring element.

15. The piston assembly of claim 1, wherein the ring element is segmented into two or more segments, wherein each respective segment is configured to move in a direction substantially orthogonal to the translation of the piston dependent of other ring element segments.

16. The piston assembly of claim 1, wherein the at least one ring element is configured to move in a direction substantially orthogonal to the translation of the piston independently from the plurality of surface bearing segments.

17. The piston assembly of claim 1, wherein the at least one ring element is configured to move in a direction substantially orthogonal to the translation of the piston dependent of the plurality of surface bearing segments.

18. The piston assembly of claim 1, wherein spatial change of the at least one ring element is dependent on movement of the plurality of surface bearing segments.

19. An engine comprising:
   a cylinder; and
   a piston assembly, configured to translate along an axis of the cylinder, comprising:
      a piston;
      at least one ring element proximate to the piston, the at least one ring element capable of spatial change relative to the piston, wherein the ring element is configured to cause a pressure difference between a first section and a second section of the cylinder during at least a portion of a compression cycle, the cylinder having an axis along which the piston assembly translates, wherein the first section is a compression section and wherein the first section and the second section are defined by a location of the ring element in the cylinder; and
      a plurality of surface bearing segments in the second section of the cylinder, wherein each respective surface bearing segment of the plurality of surface bearing segments is configured to move independently from other segments in a direction substantially orthogonal to the translation of the piston, wherein:
         the plurality of surface bearing segments comprise a flow restriction;
         the plurality of surface bearing segments are configured to maintain a clearance gap between the plurality of surface bearing segments and a surface of the cylinder,
         the clearance gap is maintained based at least in part on an outward preload force and an inward force acting on each of the plurality of surface bearing segments, wherein the inward force is generated by a pressure in the clearance gap caused by a flow of gas from a non-atmospheric pressurized gas source external of the cylinder through the flow restriction and into the clearance gap, and
         the clearance gap is comprised substantially of the gas.

20. The engine of claim 19, wherein the compression section comprises a combustion section.

21. The engine of claim 19, further comprising a linear electromagnetic machine configured to convert kinetic energy of the piston into electrical energy.

22. An apparatus comprising:
   at least one ring element configured to be positioned proximate to a piston, the at least one ring element capable of spatial change relative to the piston, wherein the ring element is configured to cause a pressure difference between a first section and a second section of a cylinder during a portion of a compression cycle, the cylinder having an axis along which the piston translates, wherein the first section is a compression section and wherein the first section and the second section are defined by a location of the ring element in the cylinder; and
   a plurality of surface bearing segments capable of spatial change configured to be positioned proximate to the piston and arranged in the second section of the cylinder, wherein each respective surface bearing segment of the plurality of surface bearing segments is configured to move independently from other segments in a direction substantially orthogonal to the translation of the piston, wherein:
      the plurality of surface bearing segments comprise a flow restriction;
      the plurality of surface bearing segments are configured to maintain a clearance gap between the plurality of surface bearing segments and a surface of the cylinder,
      the clearance gap is maintained based at least in part on an outward preload force and an inward force acting on each of the plurality of surface bearing segments, wherein the inward force is generated at least in part by a pressure in the clearance gap caused by a flow of gas from a non-atmospheric pressurized gas source external of the cylinder through the flow restriction and into the clearance gap, and
      the clearance gap is comprised substantially of the gas.

23. A pump comprising:
   a cylinder; and
   a piston assembly, configured to translate along an axis of the cylinder, comprising:
      a piston;
      at least one ring element proximate to the piston, the at least one ring element capable of spatial change relative to the piston, wherein the ring element is configured to cause a pressure difference between a first section and a second section of the cylinder during at least a portion of a compression cycle, the cylinder having an axis along which the piston assembly translates, wherein the first section is a compression section and wherein the first section and the second section are defined by a location of the ring element in the cylinder; and
      a plurality of surface bearing segments in the second section of the cylinder, wherein each respective surface bearing segment of the plurality of surface bearing segments is configured to move independently from other segments in a direction substantially orthogonal to the translation of the piston, wherein:
         the plurality of surface bearing segments comprise a flow restriction;
         the plurality of surface bearing segments are configured to maintain a clearance gap between the plurality of surface bearing segments and a surface of the cylinder,
         the clearance gap is maintained based at least in part on an outward preload force and an inward force acting on each of the plurality of surface bearing segments, wherein the inward force is generated at least in part by a pressure in the clearance gap caused by a flow of gas from a non-atmospheric pressurized gas source external of the cylinder through the flow restriction and into the clearance gap, and
         the clearance gap is comprised substantially of the gas.

24. The pump of claim 23, wherein the pump is operable as a gas compressor.

25. The pump of claim 23, wherein the pump is operable as a vacuum pump.

* * * * *